United States Patent
Bengtsson et al.

(10) Patent No.: US 9,977,887 B2
(45) Date of Patent: May 22, 2018

(54) ELECTRONIC DEVICE AND METHOD FOR VALIDATION OF A TRUSTED USER

(71) Applicant: Sony Mobile Communications Inc., Tokyo (JP)

(72) Inventors: Henrik Bengtsson, Lund (SE); Philip Sandell, Malmö (SE); Olivier Moliner, Lund (SE); Ola Thörn, Limhamn (SE); Erik Westenius, Stockholm (SE); Damjan Stamcar, Düsseldorf (DE); Alexander Rodzevski, Malmö (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 100 days.

(21) Appl. No.: 14/857,336

(22) Filed: Sep. 17, 2015

(65) Prior Publication Data

US 2017/0083693 A1   Mar. 23, 2017

(51) Int. Cl.
*G06F 21/00* (2013.01)
*G06F 21/32* (2013.01)
*G06F 3/01* (2006.01)
*G06F 3/02* (2006.01)
*G06F 3/0346* (2013.01)
(Continued)

(52) U.S. Cl.
CPC .............. *G06F 21/32* (2013.01); *G06F 3/017* (2013.01); *G06F 3/0227* (2013.01); *G06F 3/0346* (2013.01); *G06F 21/6218* (2013.01); *G06K 9/00013* (2013.01); *G06K 9/00087* (2013.01); *G06K 9/00892* (2013.01)

(58) Field of Classification Search
CPC ........ G06F 21/32; G06F 3/0227; G06F 3/017; G06F 3/0346; G06F 21/6218; G06K 9/00013; G06K 9/00087; G06K 9/00892
See application file for complete search history.

(56) References Cited

U.S. PATENT DOCUMENTS 6,241,288 B1   6/2001   Bergenek et al.
7,236,156 B2   6/2007   Liberty et al.
(Continued)

OTHER PUBLICATIONS

Graham, Brian Barkley, "Using an Accelerometer Sensor to Measure Human Hand Motion," Massachusetts Institute of Technology, May 11, 2000.
(Continued)

*Primary Examiner* — Don Zhao
(74) *Attorney, Agent, or Firm* — Tucker Ellis LLP

(57) ABSTRACT

Method for validating a trusted user of an electronic device, which electronic device comprises an input surface, e.g. on a key, dedicated for application of a user finger; a user input data sensor system, including a fingerprint sensor connected to the input surface for detecting user input fingerprint data, and a tremor sensor for detecting user input tremor data; data access to stored user input data corresponding to a trusted user; and a main processor system configured to match detected user input data with stored input data for validation of a trusted user. A triggering algorithm may run in a sub-sensor system, for sensing device handling and comparing sensed device handling with stored data. If the comparison reveals that user input is likely to occur based on the, a command is sent to the main processing system to trigger activation of tremor sensing and matching.

13 Claims, 3 Drawing Sheets

(51) Int. Cl.
    *G06F 21/62*     (2013.01)
    *G06K 9/00*      (2006.01)

(56) References Cited

U.S. PATENT DOCUMENTS

| | | | |
|---|---|---|---|
| 9,590,986 B2 * | 3/2017 | Zizi | H04L 63/0861 |
| 2007/0005988 A1 | 1/2007 | Zhang | |
| 2007/0099574 A1 | 5/2007 | Wang | |
| 2010/0155575 A1 * | 6/2010 | Lundin | G06F 1/1626 |
| | | | 250/206 |
| 2011/0055772 A1 * | 3/2011 | Hatambeiki | H04N 5/4403 |
| | | | 715/863 |
| 2012/0036261 A1 * | 2/2012 | Salazar | H04L 67/24 |
| | | | 709/225 |
| 2012/0206586 A1 * | 8/2012 | Gardner | G06K 9/00026 |
| | | | 348/77 |
| 2012/0228478 A1 * | 9/2012 | Guillaud | G06K 19/07345 |
| | | | 250/208.2 |
| 2013/0129162 A1 * | 5/2013 | Cheng | G06F 21/32 |
| | | | 382/124 |
| 2013/0133423 A1 | 5/2013 | Kim | |
| 2014/0176332 A1 * | 6/2014 | Alameh | G06F 21/32 |
| | | | 340/665 |
| 2014/0240092 A1 * | 8/2014 | Nielsen | G05B 1/00 |
| | | | 340/5.81 |
| 2014/0344954 A1 * | 11/2014 | Kim | G06F 3/0485 |
| | | | 726/28 |
| 2015/0033305 A1 | 1/2015 | Shear | |
| 2015/0074615 A1 * | 3/2015 | Han | G06K 9/00033 |
| | | | 715/863 |
| 2015/0121514 A1 * | 4/2015 | Park | G06F 21/34 |
| | | | 726/19 |
| 2015/0131852 A1 * | 5/2015 | Sweetser | G01B 11/14 |
| | | | 382/103 |
| 2015/0161461 A1 * | 6/2015 | McNulty | G06K 9/00073 |
| | | | 382/116 |
| 2015/0269409 A1 * | 9/2015 | Weber | G06F 3/044 |
| | | | 382/125 |
| 2015/0324570 A1 * | 11/2015 | Lee | G06K 9/3208 |
| | | | 382/124 |
| 2016/0063230 A1 * | 3/2016 | Alten | G06F 21/32 |
| | | | 726/28 |
| 2016/0171280 A1 * | 6/2016 | Han | G06K 9/00067 |
| | | | 348/77 |
| 2016/0171804 A1 * | 6/2016 | Chaar | G07C 9/00071 |
| | | | 340/5.52 |
| 2016/0259926 A1 * | 9/2016 | Strand | G06F 3/014 |
| 2016/0270717 A1 * | 9/2016 | Luna | G06F 19/3481 |

OTHER PUBLICATIONS

Jain, Anil et al., "Score Normalization in Multimodal Biometric Systems," Pattern Recognition 38 (2005) 2270-2285.
International Search Report and Written Opinion from corresponding International Patent Application No. PCT/EP2016/056351, dated May 24, 2016.

* cited by examiner

ELECTRONIC DEVICE AND METHOD FOR VALIDATION OF A TRUSTED USER

FIELD OF INVENTION

The present invention relates to an electronic device configured with a user data input, configured with a sensor for validating a trusted user. The user input data sensor includes a fingerprint sensor for detecting user input fingerprint data, and a tremor sensor for detecting user input tremor data. Data from both sensors may be used to validate a trusted user, by comparison with stored data. The method also relates to a method for operating such an electronic device.

BACKGROUND

Biometric sensors for verifying a user have been employed for decades in various areas. It is a well-known fact that certain biometric data is substantially unique to each person, which makes it a promising starting point for identifying such a person. Most notably, fingerprint sensors have been developed for the purpose of detecting a fingerprint and matching such a detected fingerprint with known data, but also voice recognition, retina scanning have been used. As an example, Precise Biometrics has a U.S. Pat. No. 6,241,288, which relates to an optical fingerprint identification/verification system using bitmaps of a stored fingerprint to correlate with a bitmap of an input fingerprint.

Various types of biometric sensors may be employed for giving access to information, or e.g. passage to secure areas, to trusted users only. Normally, such validation of a user is combined with other means for user identification, such as by showing proper printed identification credentials or the input of a code. One area of use for means for validating a trusted user is user input detection in electronic devices, such as mobile phones and computers. In such devices, it may be desirable to have some form of screen lock, for inhibiting access to certain information or making the device completely inoperable to anyone but a trusted user. On the other hand, such devices are normally frequently operated by the trusted user, and any type of unlocking feature should therefore not only be secure, but preferably also fast and simple. Fingerprint biometrics to logon to e.g. a mobile phone is becoming a de facto standard, and today there are devices on the market having a 3% False Rejection Rate (FRR), which means that 3 out of 100 times the system will reject a user when she tries to open the phone, even if she is the correct, trusted, user. Such a rejection, no matter how often it happens, is bad user experience.

SUMMARY

The object of the invention is to provide a user input detection solution that can be used to verify a trusted user in both a secure and simple way for the user. This is provided by means of detecting user fingerprint data at an input area, while also collecting user tremor data. These sets of data are then to verify that the input has been made by a trusted user, by matching with stored data.

According to a first aspect, the invention is related to an electronic device, comprising an input surface dedicated for application of a user finger; a user input data sensor system, including a fingerprint sensor connected to the input surface for detecting user input fingerprint data, and a tremor sensor for detecting user input tremor data; data access to stored user input data corresponding to a trusted user; and a main processor system configured to match detected user input data with stored input data for validation of a trusted user.

In one embodiment, the main processor system is configured to transition the electronic device from a first mode to a second mode responsive to validation of a trusted user.

In one embodiment, the electronic device comprises a key for activating the device, which key is displaceable responsive to a force exerted on the input surface, exceeding an input force level.

In one embodiment, the main processor system is configured to validate a trusted user based on matching of stored fingerprint data and tremor data, with input fingerprint data and tremor data detected at a common instance of application of a user finger to the input surface.

In one embodiment, the main processor system is configured to determine that there is a common instance of detecting fingerprint data and tremor data if these are detected during at least overlapping time periods.

In one embodiment, the main processor system is configured to determine that there is a common instance of detecting fingerprint data and tremor data if these are detected within a predetermined time interval.

In one embodiment, the electronic device comprises a contact sensor coupled to the input surface, wherein the main processor system is configured to determine that there is a common instance of detecting fingerprint data and tremor data if the contact sensor detects contact uninterrupted contact between detecting fingerprint data and detecting tremor data.

In one embodiment, the electronic device comprises a triggering mechanism including a sub-sensor system configured to sense device handling, wherein the triggering mechanism is configured to trigger activation of the tremor sensor responsive to determination that user input is likely to occur based on sensed device handling.

In one embodiment, said main processor system is configured to operate computer processes of matching detected user input data with stored input data, whereas the triggering mechanism is run in the sensor sub-system unit without involving the main processing system.

In one embodiment, the sensor unit of the triggering mechanism includes a motion detector configured to detect absolute motion, an environment detector configured to detect if the device is in an uncovered environment, responsive to motion sensed by the motion detector, and a gesture detector configured to trigger activation of the tremor sensor, responsive to detecting that a user is likely to be in the preparation of activating the device.

According to a second aspect, the invention relates to a method for validating a trusted user of an electronic device having a main processor system, comprising the steps of:
  detecting, at a common instance of application of a user finger to the input surface:
  user input fingerprint data with a fingerprint sensor connected to an input surface of the electronic device, and
  user input tremor data with a tremor sensor;
  matching detected user input data with stored input data for validation of a trusted user.

In one embodiment, the method comprises the step of transitioning the electronic device from a first mode to a second mode responsive to validation of a trusted user.

In one embodiment, said dedicated input surface is positioned on a key which is operated to activate the electronic device.

In one embodiment, the method comprises the steps of
  running a triggering algorithm in a sub-sensor system, including sensing device handling, and
comparing sensed device handling with stored data;
sending a command to the main processor system to trigger activation of the tremor sensor responsive to determination that user input on the key is likely to occur based on the comparison.

In one embodiment, the step of sensing device handling comprises
detecting, in the sensor sub-system, if the device is in an uncovered environment using an environment detector, and
detecting, in the sensor sub-system, movement of the device;
wherein the step of comparing sensed device handling with stored data includes comparing sensed movement data with stored movement data representing a gesture or posture indicative of a user being in the process of pressing the key.

BRIEF DESCRIPTION OF THE DRAWINGS

Embodiments will now be described in detail, while making reference to the appended drawings, on which FIG. 1 schematically illustrates user input with a finger on an electronic device for validation of a trusted user.

DETAILED DESCRIPTION

Figure 1:
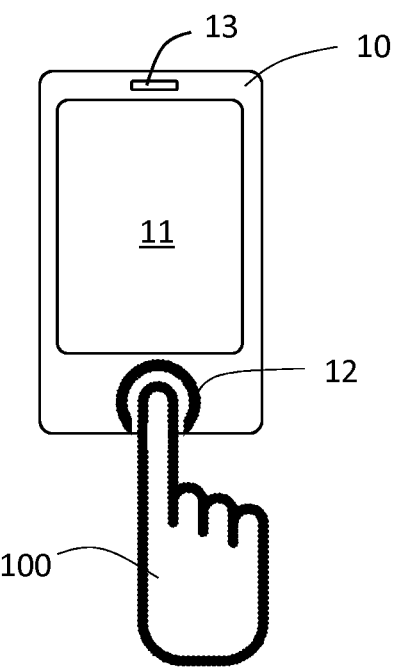

Various embodiments will now be outlined with reference to the appended drawings. It shall be understood that many different types of electronic devices may incorporate a solution for validating a trusted user according to the embodiments described herein. Such electronic devices may e.g. be realized as a passage detector, for unlocking a door or gate, a voting system, a computer accessory for login in to computer systems of banks, government authorities etc. Specific reference herein will be given to the electronic device being a portable communications apparatus, such as a mobile phone or computer. However, the skilled reader will understand that this is one type of embodiment only, and that the claims will encompass also other types of embodiments.

The solution provided and claimed is directed to the use of fingerprint sensors for identifying a trusted user. However, rather than providing an improvement to the fingerprint sensor technology as such, the suggested advantageous solution is to combine fingerprint sensing with a tremor sensing. The solutions proposed herein are based on the outcome of a study made by the applicant on tremor biometrics. Research, training and tests made by the inventors show that while tremor biometrics may be at an early stage of development, in proper combination with a fingerprint biometric system it may in fact decrease the overall FRR. The principle may be described like this: if there is more biometrics in the tremor system than 50%, where 50% represents tossing a coin, then it can be combined with fingerprint biometrics and make the total system better.

The use of tremor sensing for identification of a user has been suggested as such. U.S. Pat. No. 7,236,156 discloses a handheld devices, such as a remote control, comprising a motion sensor capable of generating data associated with movement of said handheld device, and a processing unit for detecting hand tremor data based on said movement data and for identifying a user based on said hand tremor data. The processing unit performs a training operation wherein data associated with different users holding said handheld device without introducing intentional movement thereto is recorded and processed. While this patent more than ten years ago, there is little evidence that tremor data detection was or has become significant enough to be used for this purpose.

However, after months of work and with at least 60 people helping to train the system, the applicant has ascertained that there is good biometrics to use that can contribute to lower the FRR when added to a fingerprint detection system. An object behind this work is to find a way to decrease the FRR with no other user interaction than pressing a single key, such as a pushbutton, of an electronic device. The result of the tremor detection work provided a solution to this object, namely to combine fingerprint sensing biometrics at the push of a key, with tremor sensing from one or more accelerometers at the push of the key. This way, a dedicated user input surface can be used for two purposes, with added effect but without increased user interaction. Exemplary embodiment related to this combination will now be explained.

FIG. 1 illustrates, by way of example, an electronic device 10, on which there is an input surface 12 dedicated for application of a user finger, a user 100 being indicated by means of a hand having a finger placed at the input surface 12. The electronic device 10 may additionally include an output interface for data feedback, such as a display 11 and/or a speaker 13. An electronic device of FIG. 1 may e.g. be realized as a stationary panel for the purpose of access control at the entrance of a facility, or as a mobile or portable device configured to control access to data in the electronic device 10 or otherwise accessible through the electronic device 10, e.g. by radio or wired connection to an external memory (not shown) for storing privileged data.

Figure 2:
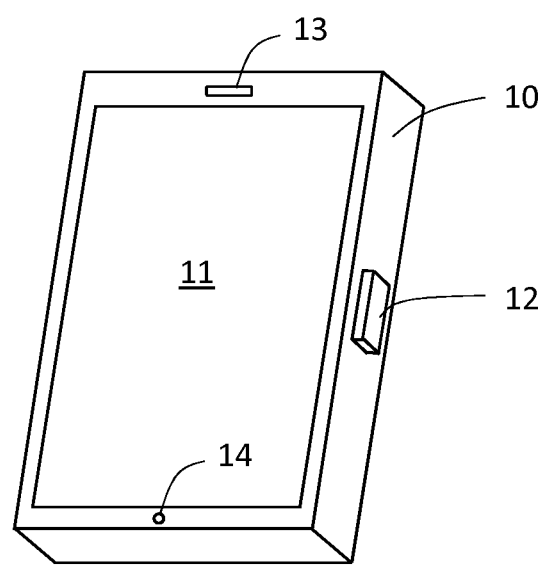
FIG. 2 illustrates an electronic device on which a dedicated input surface is provided on a key of the device.

FIG. 2 schematically illustrates an embodiment of a portable electronic device 10 embodied in accordance with the solutions proposed herein, such a mobile phone. The electronic device 10 may include a display 11, a microphone 14 and a speaker 13. It will be evident to the skilled reader that, if the electronic device 10 is a mobile phone, it will also include certain elements not shown in the drawing of FIG. 2, such as a radio interface. Certain aspects of such elements will be outlined with reference to FIG. 3 below, though. FIG. 2 additionally illustrates an input surface 12, in this embodiment placed at a side of the device 10. When operating the electronic device for validation of a trusted user, a user 100 (not shown in FIG. 2) will need to place a finger at the input surface 12, to which a user input data sensor is connected. While not shown in detail in this drawing, this user input data sensor includes a fingerprint sensor for detecting user input fingerprint data, as well as a tremor sensor for detecting user input tremor data. The electronic device 10 is configured with data access to stored user input data corresponding to a trusted user, e.g. by means of an internal memory of the electronic device 10, or by means of a communications mechanism for connecting to an external storage such as a network server. A processor system in the electronic device is configured to validate a trusted user by matching detected user input data with stored input data. A successful match, i.e. the validation that the user applying her finger on the input surface is trusted, may e.g. result in transitioning the electronic device from a first mode to a second mode, such as unlocking the device 10. More specifically, the validation may result in the provision of access to full operation of the electronic device 10, or access to a certain application or certain stored data.

Figure 3:
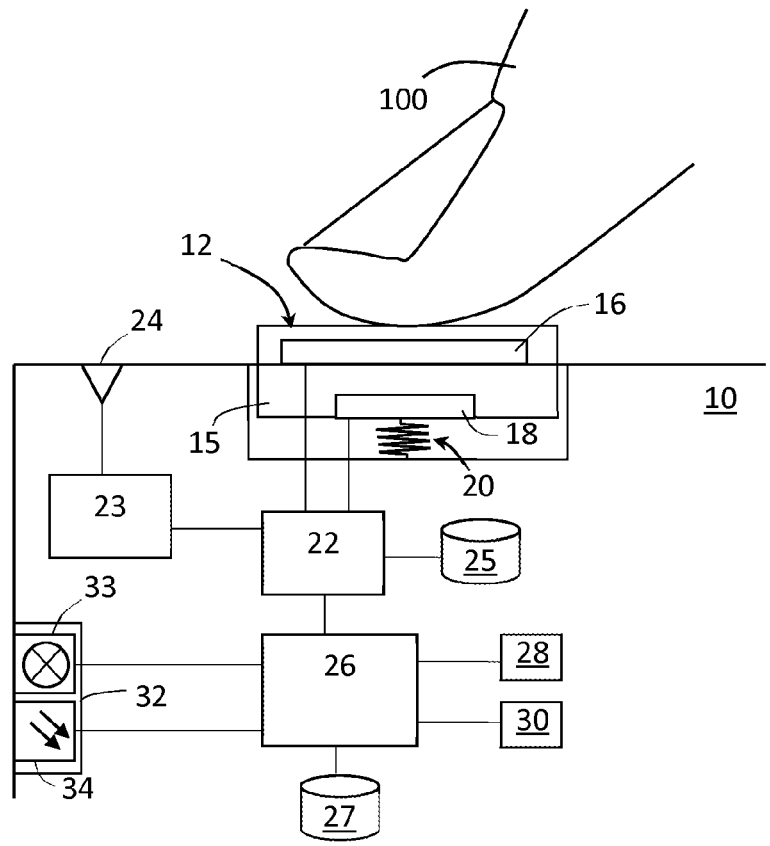
FIG. 3 schematically illustrates a combined fingerprint and tremor detection system according to an exemplary embodiment.

FIG. 3 illustrates an embodiment of the electronic device in more detail. In this embodiment the electronic device comprises a key in the form of a pushbutton 15, which is displaceable responsive to a force exerted thereon, exceeding a certain input force level. The dedicated input surface 12 includes at least a portion of the key 15, but may also include an area next to or surrounding the key 15. In the drawing, the key 15 is indicated to be configured with a spring 20 defining a certain force level to be overcome for displacing the key 15. However, this is merely an exemplary illustration to indicate this function. In an alternative embodiment, a corresponding effect may e.g. be provided with a dome type button, according to the established art. Preferably, the key 15 is operatively connected to activate one or more functions in the device 10, such as to light up the screen 11. In one embodiment, the key 15 may also function as a power on/off key, e.g. responsive to long-press.

A fingerprint sensor 16 is provided in connection with the input surface 12, as a part of a user input data sensor. A variety of different types of fingerprint sensors are available on the market, and the specific function thereof is not essential to the operation of the proposed solution for the electronic device 10. In the drawing, the fingerprint sensor 16 is provided in the displaceable key 15 under or at its top surface. In an alternative embodiment, in which the dedicated input surface 12 includes at least a portion beside or around the key 15, the fingerprint sensor may be provided beside the key 15, e.g. circumferentially around the key 15. The fingerprint sensor 16 is connected to a processor system 22, capable of controlling a process of fingerprint matching of data detected by sensor 16 with stored fingerprint data. Such stored fingerprint data may be accessed from a local memory 25, or from a remote memory (not shown) by means of a data transceiver 23 and a network interface 24. Such a network interface may comprise a modem, and the network interface may comprise a radio antenna.

The user input data sensor further includes a tremor sensor 28 for detecting tremor data from a user 100. Tremor, as used herein, refers to involuntary movements of the human body, such as of the hands. Tremor may entail shaking hands, which is clearly visible to others, but also finer movements that aren't really perceived or noted by normal human senses. Such fine muscle tremor, when measured with a sensitive detector, can to a certain part be shown to be characteristic for a certain user, with respect to e.g. frequency, repetition rate, amplitude and more complex movements like gesture patterns. In this respect, reference can also be made to the example of distinguishable eigenvalues, as taught in the aforementioned U.S. Pat. No. 7,236, 156. In one embodiment, the tremor sensor comprises one or more accelerometers 28, such as three single axis accelerometers arranged to detect acceleration in different dimensions. Such a use of accelerometers has been shown and tested in the past, e.g. in "Using an Accelerometer Sensor to Measure Human Hand Motion" by Brian Barkley Graham at the Massachusetts Institute of Technology on May 11, 2000. Furthermore, the inventors of the present application have successfully made use of state of the art accelerometers in mobile phones of the applicant's brand. After training of a tremor-based identification system, the inventors have shown that it is clearly possible to get an identification which distinguishes a trusted user from an imposter. At this point, such tremor-based identification is less accurate than fingerprint sensing, but substantially better than tossing a coin. It is therefore proposed to combine the comparatively effective fingerprint-based identification with the less effective tremor-based identification, and thereby obtain an improvement as compared to solely using fingerprint detection, e.g. in terms of FRR.

Figure 4:
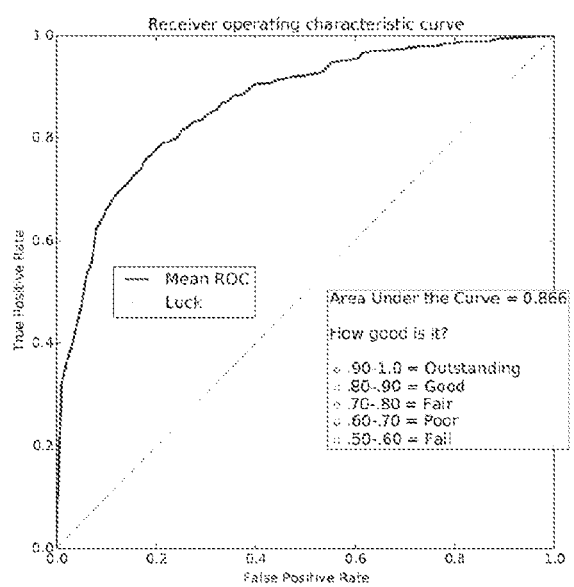
FIG. 4 illustrates a receiver operating characteristics curve for a tremor detection sensor as used and trained by the applicant.

FIG. 4 illustrates a measure known as ROC (receiver or relative operating characteristic), to which biometrics systems often are compared. The ROC plot is a visual characterization of the trade-off between the FAR (False Acceptance Rate) and the FRR. Biometric systems incorporate a matching algorithm, which typically performs a decision based on a threshold which determines how close to a template the input needs to be for it to be considered a match. If the threshold is reduced, there will be fewer false non-matches but more false accepts, whereas a higher threshold will reduce the FAR but increase the FRR. The inventors of the present application have hitherto obtained a ROC curve which is plotted in FIG. 4. The area under the ROC curve is optimally 1.0, whereas 0.5 means tossing a coin (luck). Presently the obtained result is at about 0.8, which is far less than fingerprint matching, but still good.

Returning to FIG. 3, the tremor sensor 28 may in one embodiment be connected to a sensor sub-system 26, which in turn is connected to the main processor system 22 by means of a digital interface. Matching algorithms for fingerprint sensor 16 and for tremor sensor 28, respectively, may reside as code executed in the main processor system 22 in combination with data stored in a local memory 25. Operation of matching algorithms may be triggered by the outcome of one or more steps carried out in the sensor sub-system, as will be outlined further below with reference to FIG. 5.

Preferably, the processor 22 is configured to validate a trusted user 100 based on matching of stored fingerprint data and tremor data with input fingerprint data and tremor data detected at a common instance of application of a user finger to the input surface. This way, it may be ascertained that the fingerprint data and tremor data are obtained from the same user.

In one embodiment, the processor 22 is configured to determine that there is a common instance of detecting fingerprint data and tremor data if these are detected during at least overlapping time periods. As an alternative, the processor 22 may be configured to determine that there is a common instance of detecting fingerprint data and tremor data if these are detected within a predetermined time interval. In any of these embodiments, timing data may e.g. be based on a system clock of the processor system 22.

In one embodiment, a contact sensor 18 may be coupled to the input surface 12, for detecting that an object is in connection with the input surface 12. The contact sensor may be capacitive, so as to detect intentional touch of a user 100, whereas e.g. touches of fabric in a pocket will not create a reading on the contact sensor 18. In another embodiment, a contact sensor 18 may be sensitive to pressure. Such a contact sensor may e.g. be a mechanical switch, connected to give an electrical signal responsive to pressing down of the key 15, or a piezo element connected to give an electrical signal upon pressure on the key 15. In one embodiment, the processor may be configured to determine that there is a common instance of detecting fingerprint data and tremor data if the contact sensor 18 detects contact uninterrupted contact between detecting fingerprint data and detecting tremor data.

The processor system 22 is preferably configured to carry out matching using locally stored data in memory 25, but in an alternative embodiment it may be configured to transmit detected fingerprint data for network matching, and receive the outcome of the matching, e.g. via transceiver 23 and antenna 24, for validation of whether the user is trusted. In any case, it would be beneficial to narrow down noise/false-cases of the tremor sensor 28.

Figure 5:
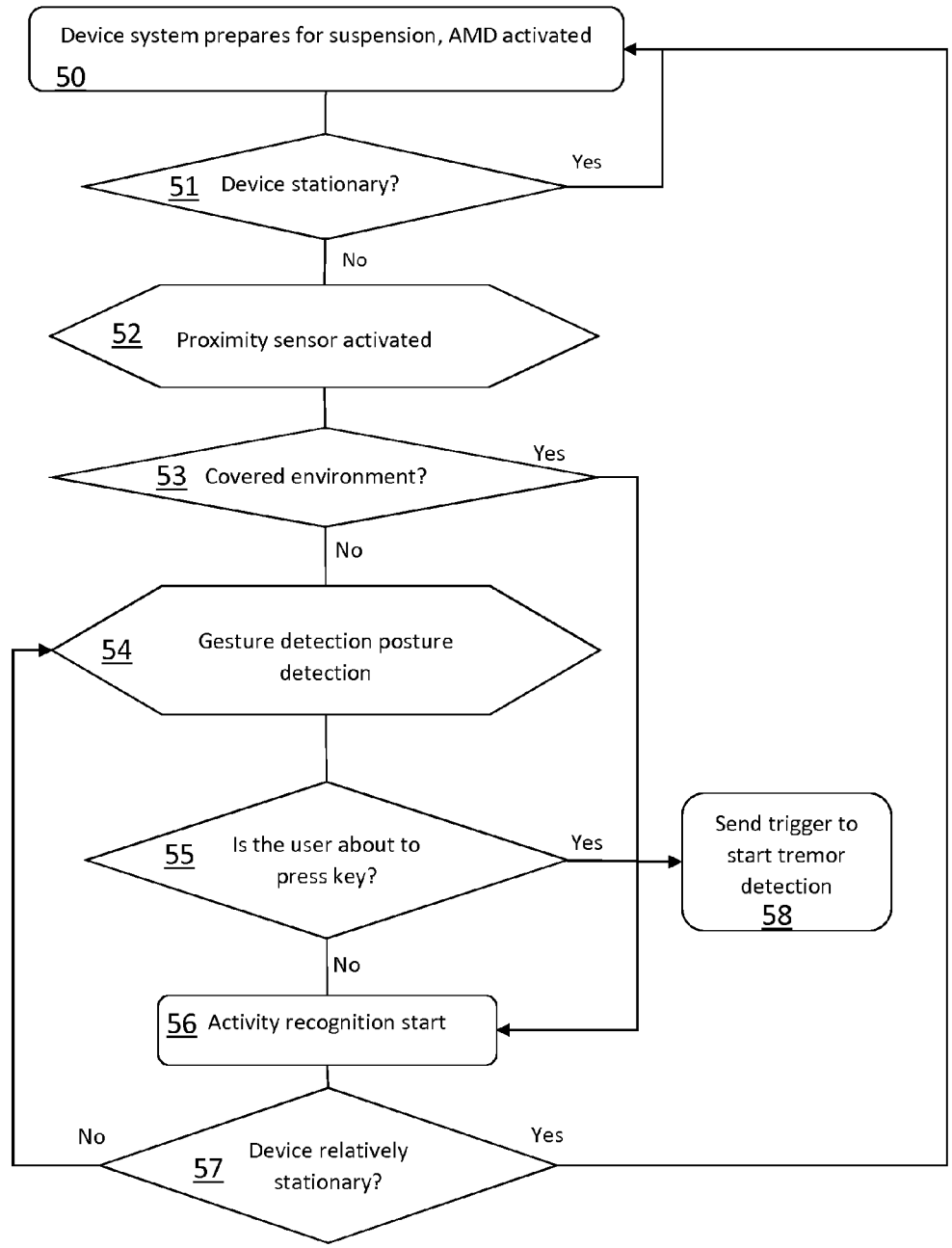
FIG. 5 schematically illustrates a flow chart of an algorithm for triggering tremor detection upon to be used for validation of a trusted user according to an embodiment.

The inventors propose to add an additional advantage to the system by employing a smart trigger algorithm, so as to only execute tremor scanning and matching when the user 100 makes a deliberate action to pick up the phone to push the power key. Such an embodiment will now be described for a handheld electronic device 10, such as a mobile phone. Reference is made to FIGS. 3 and 5, and is based on the intent of utilizing absolute motion tracking, activity recognition and covered-environment detection to determine when the user 100 is picking up the handheld electronic device 10 and is about to press the key 15, to trigger tremor scanning as fingerprint FRR aid.

In a preferred embodiment, preparatory detection and measurement of handling of the electronic device is carried out by comparatively low-tech sensors that are present in any modern handheld mobile phone, and this is done with minimal system impact and power consumption. Essentially, the object is to minimize the tremor detection sequences which will be used with the sub-sequential fingerprint scanning in order to determine the user's ID.

FIG. 3 shows a schematic representation of the system overview for this embodiment. More specifically, a trigger algorithm for deciding when a valid motion is performed so as to activate tremor detection, is realized in an offloading manner with the trigger running in a sensor sub-system 26. This way, the main processor system 22 will only be involved when valid motion is detected. This means that the tremor tracking/recording/matching algorithm will be executed on deliberate data, thus enhancing the performance on the actual tremor detection algorithm. In addition, system power performance is improved by avoiding excessive use of the main processor system 22.

FIG. 5 shows a flow chart of an algorithm for triggering tremor detection in a handheld electronic device 10, for use when a user 100 is about to press a key 15, such as a power key, with a fingerprint sensor 16.

In step 50, where the device 10 is idle, the sensor sub-system 26 handles sporadic interrupts for an absolute motion detector (AMD). An AMD can be realized with any 3-axis accelerometer, preferably the same as sensor 28 used for tremor scanning, where each axis may be configured with a gravity-threshold for detecting when a device 10 is completely still or in motion. The output of the AMD function of sensor 28 may be the first trigger in the tremor detection activation algorithm. This should preferably be done through an interrupt driven setup where the accelerometer itself if configured with axis thresholds and generates hardware interrupts upon stationary/movement detections.

In step 51 it is detected whether the AMD 28 indicates stationary or motion. If stationary, "Yes" in the drawing, the sensor sub-system 26 goes back to the active AMD state and waits a predetermined period before checking again. If motion is detected, "No" in the drawing, the algorithm goes in to the next state; covered-environment detection.

In step 52, when motion has been detected, a proximity sensor 32 is activated in order to determine if the device is in a pocket, or other covering environment. In one embodiment, as indicated in FIG. 3, the proximity sensor 32 comprises a light source 33 operated together with a light sensor 34, for detecting nearby reflections of light from the light source 33. Such a proximity sensor is preferably operated at short-burst intervals. Other types of proximity sensors may be used though, as known in the field of mobile phones.

Step 53 indicates the outcome of the proximity detection. Until the device 10 is determined to be in an uncovered environment there is no need for the tremor detection sequence to start. So, if the device 10 is deemed to be covered, "Yes", the algorithm may continue to a state of activity recognition, as will be described below. If the device 10 is considered to not be covered, based on the proximity detection step, "No", the first comparatively simple steps have been carried out for determining that the user 100 may be in the process of pressing the key 15. The algorithm may then continue to a state of gesture and posture detection.

Step 54 involves gesture and posture detection of a device 10, which is deemed to be in motion and not covered (i.e. not in a bag, pocket, foldable cover etc.). In one embodiment, gesture and posture detection can be achieved by sampling a 3-axis accelerometer 28 and gyroscope 30, of the sensor sub-system 26, simultaneously. This should preferably be done for a short period, e.g. in the range of 30-60 sec, in order to minimize sensor drift and power consumption. The sampled output from the detectors 28, 30 may then be matched in the sensor sub-system 26 to a predefined set of gestures/postures, e.g. stored in a local memory 27, which are defined to be indicative of a forthcoming press of the key 15. As an example, such a gesture may be the flipping of the electronic device 10 from a display down to a display up position on a horizontal surface. Another example may be a change of position and orientation from a first position to a second position, indicating that a user is pulling the device 10 from a bag, pocket or resting surface, to a position seemingly in front of the user's face. Such a gesture may e.g. be gathered from the range of movement, the relative starting orientation and the relative end orientation, and there are several known processes for sampling sensor data and matching them to gestures/postures in the art.

In step 55, the outcome of the gesture and posture detection is determined. If, at any time during the sampling period, it is detected that the electronic device 10 has been subjected to a motion and/or posture that aims towards the user 100 being in the process of picking up the device 10 for pressing the key 15, "Yes", the tremor detection sequence is started. Else, "No", the algorithm goes in to the next state; Activity Recognition. In a preferred embodiment, activity recognition 56 may be initiated Step 56 indicates the algorithm step of activity recognition. There are many known activity recognition algorithms that are able to do rudimentary activity recognition, e.g. walking, running, running a bike, sitting in a car etc., just by using a 3-axis accelerometer such as sensor 28. For higher accuracy and for more activity class detections, these algorithms can be aided by other motion sensors such as gyroscope 30 and even more sensors like magnetometer and barometric pressure sensors (not shown in FIG. 3). However, for the purpose of this trigger detection algorithm, accelerometer 28 output would be enough.

Once the device is in motion, as determined in step 51, but the key 15 has not been pressed, the activity recognition algorithm is activated in step 56, and the user-activity may be tracked regardless of whether the device is deemed to be in a covered environment or not, as indicated in FIG. 5. This way, the algorithm can track/profile accelerometer 28 data when the user carries the device in a covered environment (bag or pocket) or when carrying it in the hand. This data can then be used both as a baseline for detecting gestures/postures in step 54 while walking/running/biking, and as a discriminator when NOT to activate the tremor detection sequence in step 55, i.e. just walking and no deliberate about-to-press-key movement. In addition, the activity recognition may be sampled for training purposes in combination with acts of actual pressing of the key 15, so as to determine what gestures or postures shall be deemed to be indicative of a forthcoming key 15 press in step 55.

In step 57, if it is determined that the device 10 is relatively stationary, "Yes", in the sense that follows a known pattern of movement activity, such as riding a car, walking etc., the device may go back to prepare for an idle mode in step 50, from which the algorithm may continue as above. However, if it is determined that the device 10 is in hand and about to be used, in addition to a general movement bias, "No", the algorithm may go back to sample gesture and posture in step 54, at which the gyroscope 30 preferably is sub-sequentially activated in order to catch potential gesture/poster detection.

Step 58 show the step of sending a command to the main processor system 22 from the sensor sub-system 26 to start the tremor detection sequence. The tremor detection by detector 28 and matching carried out in the main processor system 22 may then be performed and combined with fingerprint detection and matching, as described, so as to improve user identification and validation as performed by fingerprint detection and matching only. In one embodiment, also the determined activity from step 56, if captured, may be conveyed to the man processor system 22. This data may be used as a baseline for the tremor detection algorithm in the main processor system 22, so as to improve detection accuracy of fine tremor movements of the user 100.

As noted, matching of fingerprint data and tremor data with stored data may be carried out in the main processing system 22, or in a network to which the electronic device 10 is connected. The step of combining scores of two different matching algorithms, i.e. fingerprint and tremor in this case, can be carried out in different ways. This step is based on the notion that a user identification based on a good score from a fingerprint sensor 16, having an FRR of e.g. 3%, in fact can be made even better when combined with a less good, but better than chance, score from a tremor sensor 28. The precise way of carrying out such combination of scores is not the object of this application, and instead reference is made to state of the art means for carrying out such processing. As mere examples, it is possible to apply a combination algorithm based on any one or more rule based on sum, weighted sum, product, min/max, product of likelihood ratios. Another known alternative is to apply a so-called classifier, based on e.g. a Support Vector Machine. Alternative classifiers may include logistic regression, k-nearest neighbors, decision trees, etc. Prior to applying a fusion algorithm, the scores may need to be normalized, using one of several methods, such as min-max normalization, z-scoring, Tanh normalization, etc. Examples of procedures, rules and algorithms for combining biometric systems can e.g. be found in "Score normalization in multimodal biometric systems", by Anil Jain, Karthik Nandakumar and Arun Ross as published in Pattern Recognition 38 (2005) 2270-2285. Which combination of normalization method and fusion algorithm to use depends on the actual use case, and is usually decided empirically.

One benefit of the proposed solution is that, dependent on setting, it may be possible to reduce FAR, by requiring that both sensors, fingerprint and tremor, detect the same trusted user, or to reduce FRR and increase usability by requiring that only one of fingerprint and tremor detects a trusted user. The first setting may e.g. be applied for high security access detection, such as for accessing banking details. The second setting, on the other hand, may be used for less sensitive access detection, such as an unlock feature to open a mobile phone to at least rudimentary operation, e.g. for calling or browsing.

In conclusion, a tremor biometrics system in a stand-alone setting is not good enough for security applications. The aforementioned patent describes using tremors to differentiate between known users of a remote control unit in order to adapt the settings of a media system; in other words, it is a comfort use, without security requirements. It is, however, not obvious to use tremors for security applications, and the step of combining tremor-detection with fingerprint-detection for making the total system better is thus non-obvious. There is furthermore a great advantage in combining fingerprint biometrics with tremor biometrics, since both are triggered by the same event for the embodiment of pushing of a key. Other systems, such as gait identification, touch pattern, voice and face recognition are not triggered by the same event as the fingerprint system, and require either additional actions or continuous/recurrent monitoring because of their high latencies (in the order of several seconds for e.g. gait recognition).

On a general note, functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The invention claimed is:

1. An electronic device, comprising:
   a user input data sensor system, including:
   an input surface against which a user applies a finger to authenticate the user,
   a fingerprint sensor arranged relative to the input surface and configured to detect a user fingerprint and to generate corresponding user fingerprint data, and a tremor sensor arranged relative to the input surface and configured to detect involuntary tremor movement of the user finger and to generate corresponding user tremor data, and wherein a single application of the user finger to the input surface triggers the user input data sensor system to i) detect the user fingerprint and the involuntary tremor movement of the user finger from the single application of the user finger and ii) generate each of the corresponding user fingerprint data and the corresponding user tremor data;

a data memory to store user input data corresponding to a trusted user, the user input data including fingerprint data of the trusted user and tremor data of the trusted user;

a processor system configured to:
receive the user fingerprint data and the user tremor data generated by the user input data sensor system in response to the single application of the user finger to the input surface;

execute a fingerprint authentication algorithm to match the received user fingerprint data with the stored fingerprint data of the trusted user for producing a first output, corresponding to and separate from the execution of the finger print authentication algorithm, execute a tremor authentication algorithm to match the received user tremor data with the stored tremor data of the trusted user for producing a second output, and validate the trusted user by combining the first and second outputs resulting from the fingerprint authentication algorithm and the tremor authentication algorithm, respectively.

2. The electronic device of claim 1, wherein the processor system is configured to transition the electronic device from a first mode to a second mode responsive to validation of the trusted user.

3. The electronic device of claim 2, comprising a key for activating the electronic device, wherein the key is displaceable responsive to a force exerted on the input surface exceeding an input force level, the input surface part of the key.

4. The electronic device of claim 1, comprising a key for activating the electronic device, wherein the key is responsive to a force exerted on the input surface, the input surface part of the key.

5. The electronic device of claim 1, further comprising a triggering mechanism including a sub-sensor system configured to sense device handling and to determine that user input is likely to occur based on sensed device handling, wherein the triggering mechanism is configured to trigger activation of the tremor sensor responsive to determination that the user input is likely to occur based on sensed device handling.

6. The electronic device of claim 5, wherein said processor system is configured to operate computer processes of matching the user input data with stored input data, whereas the triggering mechanism runs on the sensor sub-system unit without involving the processor system.

7. The electronic device of claim 6, wherein the sensor unit of the triggering mechanism includes:
a motion detector configured to detect absolute motion,
an environment detector configured to detect if the electronic device is in an uncovered environment, responsive to motion sensed by the motion detector, and
a gesture detector configured to trigger activation of the tremor sensor, responsive to determination that user input is likely to occur.

8. The electronic device of claim 5, wherein the sensor unit of the triggering mechanism includes:
a motion detector configured to detect absolute motion,
an environment detector configured to detect if the electronic device is in an uncovered environment, responsive to motion sensed by the motion detector, and
a gesture detector configured to trigger activation of the tremor sensor, responsive to determination that user input is likely to occur.

9. A method for validating a trusted user of an electronic device having a processor system, comprising steps of:
detecting a single application of a user finger to an input surface of the electronic device;
sensing, with a user input data sensor system arranged relative to the input surface, a user fingerprint and involuntary tremor movement of the user finger during the single application of the user finger to the input surface and generating corresponding user fingerprint data and user tremor data, the user fingerprint data and user tremor data received by the processor system in response to the single application of the user finger to the input surface;
executing, with the processor system, a fingerprint authentication algorithm to match the received user fingerprint data with stored fingerprint data for the trusted user for producing a first output;
executing, with the processor system and corresponding to and separate from the executing of the fingerprint authentication algorithm, a tremor authentication algorithm to match the received user tremor data with stored tremor data for the trusted user for producing a second output; and
validating the trusted user by combining the first and second outputs resulting from the fingerprint authentication algorithm and the tremor authentication algorithm, respectively.

10. The method of claim 9, further comprising a step of transitioning the electronic device from a first mode to a second mode responsive to validation of the trusted user.

11. The method of claim 9, wherein said input surface is positioned on a key which is operated to activate the electronic device.

12. The method of claim 11, further comprising steps of:
running a triggering algorithm in a sub-sensor system, including
sensing device handling, and
comparing sensed device handling with stored data;
sending a command to the processor system to trigger activation of a tremor sensor of the user input data sensor system responsive to determination that user input on the key is likely to occur based on the comparison.

13. The method of claim 12, wherein the step of sensing device handling comprises:
detecting, in the sensor sub-system, if the device is in an uncovered environment using an environment detector, and
detecting, in the sensor sub-system, movement of the electronic device;
wherein the step of comparing sensed device handling with stored data includes comparing sensed movement data with stored movement data representing a gesture or posture indicative of a user being in the process of pressing the key.

\* \* \* \* \*